US011237018B2

(12) United States Patent
Petitgrand et al.

(10) Patent No.: US 11,237,018 B2
(45) Date of Patent: Feb. 1, 2022

(54) DATA CONCENTRATION APPARATUS AND SYSTEM FOR ADVANCED METERING

(71) Applicant: UBIIK INC., Taipei (TW)

(72) Inventors: Fabien Petitgrand, Taipei (TW); Tien-Haw Peng, Taipei (TW); Chun-Yu Liu, Taipei (TW)

(73) Assignee: UBIIK INC., Taipei (TW)

( * ) Notice: Subject to any disclaimer, the term of this patent is extended or adjusted under 35 U.S.C. 154(b) by 17 days.

(21) Appl. No.: 17/015,095

(22) Filed: Sep. 9, 2020

(65) Prior Publication Data

US 2021/0072043 A1 Mar. 11, 2021

(30) Foreign Application Priority Data

Sep. 9, 2019 (TW) .................................. 108132492

(51) Int. Cl.
*G01D 4/00* (2006.01)
*G06Q 50/06* (2012.01)
*H04W 72/04* (2009.01)

(52) U.S. Cl.
CPC ............. *G01D 4/002* (2013.01); *G06Q 50/06* (2013.01); *H04W 72/042* (2013.01); *H04W 72/0413* (2013.01)

(58) Field of Classification Search
CPC ........ G01D 4/002; G01D 4/004; G06Q 50/06; H04W 72/0413; H04W 72/042; H04W 4/38; H04W 72/1242; Y02B 90/20; Y04S 20/30
USPC ..................................................... 340/870.02
See application file for complete search history.

(56) References Cited

U.S. PATENT DOCUMENTS

| 2010/0214123 | A1* | 8/2010 | Smith | G01D 4/004 340/870.02 |
|---|---|---|---|---|
| 2016/0345080 | A1* | 11/2016 | Saikusa | G01D 4/002 |
| 2017/0019248 | A1* | 1/2017 | Mustafa | H04L 9/007 |
| 2017/0153124 | A1* | 6/2017 | Li | H04Q 9/00 |
| 2020/0007191 | A1* | 1/2020 | Teboulle | H04B 3/54 |
| 2020/0408565 | A1* | 12/2020 | Lee | G06F 8/65 |
| 2021/0321176 | A1* | 10/2021 | Aguado Giraldo | H04Q 9/04 |

FOREIGN PATENT DOCUMENTS

KR     101991902 B1 * 6/2019

\* cited by examiner

*Primary Examiner* — Hirdepal Singh

(57) ABSTRACT

A system for advanced metering includes a data concentration device and a data acquiring device. The data concentration device, configured to be physically attached to a first meter to obtain first data, includes a data interface capable of being electrically coupled to the first meter and a data concentration module capable of wireless communication using a first communication standard and wireless communication with a communication network using a second communication standard. The data acquiring device is configured to be physically attached to a second meter to obtain second data and capable of wireless communication using the first communication standard. The data concentration module transmits a first message including the first data to the communication network, selectively allows wireless communication using the first communication standard for the data acquiring device to enable transmission of the second data, and transmits a second message including the second data to the communication network.

19 Claims, 14 Drawing Sheets

DATA CONCENTRATION APPARATUS AND SYSTEM FOR ADVANCED METERING

CROSS-REFERENCE TO RELATED APPLICATION

This non-provisional application claims priority under 35 U.S.C. § 119(a) on Patent Application No(s). 108132492, filed in Taiwan, R.O.C. on Sep. 9, 2019, the entire contents of which are hereby incorporated by reference.

BACKGROUND OF THE INVENTION

1. Field of the Invention

The present disclosure relates to advanced metering technology and in particular to a data concentration apparatus and system for advanced metering.

2. Description of the Related Art

Advanced Metering Infrastructure (AMI) typically refers to the full measurement and collection system that includes meters at the customer site, communication networks between the customer and a service provider, such as an electricity, gas, or water utility, and data reception and management systems that make the information available to the service provider.

The communication network in an advanced metering infrastructure system may be implemented using different communication technologies. In a type of implementation of the communication network based on a low-power wide-area network (LPWAN), a number of metering devices are installed on the customer sites and communicate with a smaller number of gateway devices situated between the customer sites and a wireless or fixed line communication network. The deployment of the gateway devices requires carefully chosen geographical locations, where the gateway devices may be mounted on towers or poles, or buildings, so as to ensure reliable signal coverage. The locations are dedicated for installation, operation, and maintenance of the gateway devices, and should provide sufficient and reliable power if the gateway devices are not battery-powered. In addition, the installation and maintenance of the gateway devices involves large resources and costs. In particular, communication charges are required if the gateway devices employ mobile communications to communicate with the backhaul of the AMI system. As such, the deployment of the gateway devices is complicated and inefficient, leading to the complexity of the implementation of the AMI system.

BRIEF SUMMARY OF THE INVENTION

An objective of the present disclosure is to provide a data concentration apparatus which integrates wireless communications and data acquiring so as to facilitate implementation of an advanced metering infrastructure system with reduced complexity.

To achieve at least the above objective, the present disclosure provides a data concentration apparatus for use in an advanced metering infrastructure system, wherein the advanced metering infrastructure system includes a communication network and a plurality of meters including a first meter and a second meter, and the second meter has a data acquiring device. The data concentration apparatus includes a data interface and a data concentration module. The data interface is capable of being electrically coupled to the first meter to obtain first data originated in the first meter. The data concentration module is electrically coupled to the data interface and is capable of wireless communication using a first communication standard and wireless communication with the communication network using a second communication standard. The data concentration apparatus is configured to be physically attached to the first meter. The data concentration module is capable of transmitting a first message to the communication network, and the first message includes the first data and a first indicator indicating that the first data originates in the first meter. The data concentration module selectively allows wireless communication using the first communication standard for the data acquiring device. The data concentration module, when receiving the second data transmitted from the data acquiring device, transmits a second message to the communication network, and the second message includes the second data and a second indicator indicating that the second data originates in the second meter.

In an embodiment, the data concentration module includes a first communication unit and a second communication unit. The first communication unit is capable of wireless communication using the first communication standard. The second communication unit, electrically coupled to the data interface and the first communication unit, is capable of wireless communication with the communication network using the second communication standard, wherein the second communication unit transmits the first message to the communication network. The first communication unit selectively allows uplink transmission for the data acquiring device so as to enable the data acquiring device to transmit the second data, and the first communication unit, when receiving the second data, transmits a second message to the communication network through the second communication unit.

In an embodiment, the data concentration apparatus is operable in one of a plurality of modes including a first mode and a second mode; in the first mode, the data concentration apparatus serves as a device for data acquiring that enables wireless communication using the first communication standard and disables wireless communication using the second communication standard; in the second mode, the data concentration apparatus serves as a base station or gateway that enables wireless communication using the first communication standard and wireless communication using the second communication standard.

In an embodiment, the data concentration apparatus is operable to search for any communication device serving as a base station or gateway which provides a wireless link using the first communication standard; when the data concentration apparatus finds and links to the communication device, the data concentration apparatus is operable in the first mode; when the data concentration apparatus does not find or fails to link to the communication device, the data concentration apparatus is operable in the second mode.

In an embodiment, the data concentration module is configured to allow downlink transmission for the data acquiring device when there is downlink data to be sent to the data acquiring device and a number of allocated downlink time slots in the radio resource is less than a downlink allocation number threshold.

In an embodiment, the data concentration module is configured to allow uplink transmission for the data acquiring device according to a corresponding priority of the data acquiring device.

In an embodiment, the data concentration module is configured to allow uplink transmission for the data acquiring device according to a waiting time of the data acquiring device.

In an embodiment, the data concentration module is configured to allow uplink transmission for the data acquiring device according to a corresponding priority of the data acquiring device and a waiting time of the data acquiring device.

In an embodiment, the first communication unit includes a transceiver unit.

In an embodiment, the first communication unit further includes a controller electrically coupled between the transceiver unit and the second communication unit.

In an embodiment, the first communication unit communicates with a server via the second communication unit so as to selectively allow the wireless communication using the first communication standard for the data acquiring device.

To achieve at least the above objective, the present disclosure further provides a system for advanced metering including a data concentration device and a data acquiring device. The data concentration device is configured to be physically attached to a first meter to obtain first data from the first meter. The data concentration device includes a data interface and a data concentration module. The data interface is capable of being electrically coupled to the first meter to obtain the first data from the first meter. The data concentration module is electrically coupled to the data interface and is capable of wireless communication using a first communication standard and wireless communication with a communication network using a second communication standard. The data concentration module transmits a first message to the communication network, and the first message includes the first data and a first indicator indicating that the first data originates in the first meter. The data acquiring device is configured to be physically attached to a second meter to obtain second data from the second meter and is capable of wireless communication using the first communication standard. The data concentration module selectively allows wireless communication using the first communication standard for the data acquiring device. The data concentration module, when receiving the second data transmitted from the data acquiring device, transmits a second message to the communication network, and the second message includes the second data and a second indicator indicating that the second data originates in the second meter.

In an embodiment, the data concentration module is configured to allow downlink transmission for the data acquiring device when there is downlink data to be sent to the data acquiring device and the number of allocated downlink time slots in radio resources is less than a downlink allocation number threshold.

In an embodiment, the data concentration module is configured to allow uplink transmission for the data acquiring device according to one or both of a corresponding priority of the data acquiring device and a waiting time of the data acquiring device.

In an embodiment, the data concentration module communicates with a server via the wireless communication with the communication network using the second communication standard so as to selectively allow the wireless communication using the first communication standard for the data acquiring device.

In an embodiment, the data acquiring device transitions to a power saving mode when the data acquiring device has no data to be sent.

In an embodiment, the data acquiring device resumes from the power saving mode when the data acquiring device has any data to be sent, and the data acquiring device transmits the data to the data concentration device when the data concentration device allows uplink transmission for the data acquiring device.

In an embodiment, the data concentration device is powered by the first meter and the data acquiring device is powered by the second meter.

In an embodiment, the data concentration apparatus is battery-powered and the data acquiring device is battery-powered.

DETAILED DESCRIPTION OF THE INVENTION

To facilitate understanding of the object, characteristics and effects of this present disclosure, embodiments together with the attached drawings for the detailed description of the present disclosure are provided.

Figure 1A:
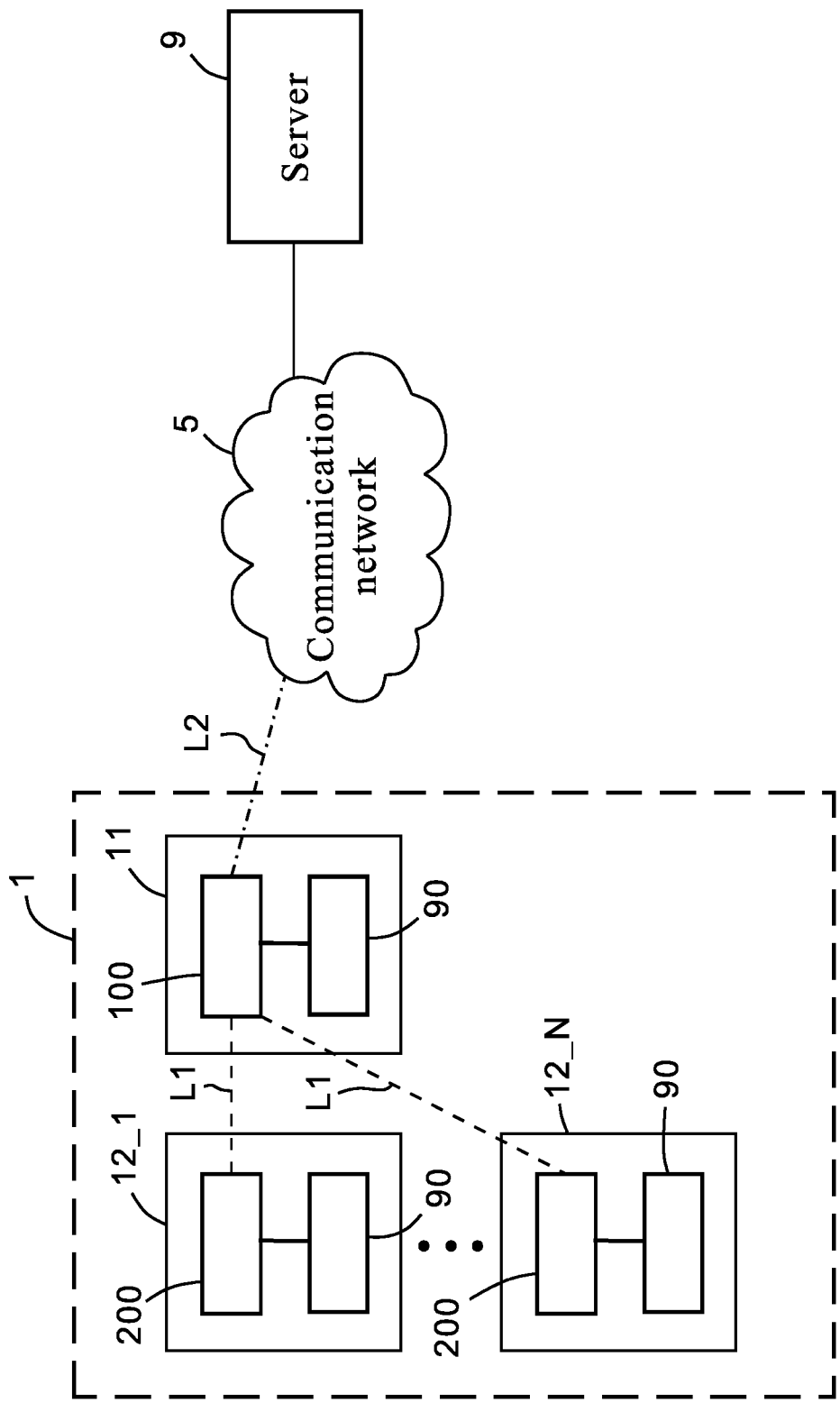
FIG. 1A is a schematic diagram illustrating a system for advanced metering employed in an implementation of an advanced metering infrastructure, according to an embodiment of the present disclosure.

Referring to FIG. 1A, a system for advanced metering employed in an implementation of an advanced metering infrastructure is illustrated according to an embodiment of the present disclosure. As exemplified in FIG. 1A, the implementation of the advanced metering infrastructure includes a field area network 1, a communication network 5, and a server 9. The field area network includes a number of meters, for example, meters 11, 12_1 to 12_N (where N can be any positive integer, 1, 2, 10, 50, 100, 1000, or above), equipped with communication and logic circuitry for wireless communication between the communication network 5 wherein the meters can be utility meters or other meters located at customer sites, such as buildings, factories, and so on. The communication network 5 can be a wireless network or a combination of a wireless network and fixed line network, such as a network based on 3G, 4G, or 5G technology, and/or any other communication technology such as the Internet. The server 9 can be a backend controller for collecting data, for example meter data or other status, corresponding to the meters.

In FIG. 1A, the system for advanced metering includes a data concentration device 100 and one or more data acquiring devices 200, which are configured to be physically attached to their respective meters, for example, meters 11, 12_1 to 12_N, to obtain corresponding data from the meters. The attachment or disposition of the data concentration device 100 or data acquiring device 200 can be implemented in various forms. For example, the data concentration device 100 or data acquiring device 200 can be implemented to be embedded into or removably connected to a corresponding meter so that the data concentration device 100 or data acquiring device 200 does not require additional accommodation space outside of the meter. From the viewpoint of the meters, the data concentration device 100 or data acquiring device 200, once being attached to a meter, operates as a modular device or as a part of the meter. Each of the meters can be configured to provide an accommodation space in or inside the housing of the meters or provide a structure such as a container, socket, docking fixture and so on for the attachment or disposition of the data concentration device 100 or data acquiring device 200. As shown in FIG. 1A, each of the meters 11, 12_1 to 12_N includes a measurement circuit 90 which measures data from the meter (e.g., utility meter (electricity, water, or gas)) and converts the measured data, for example, meter reading or status, into a data format. The data concentration device 100 or data acquiring device 200, when physically attached to a meter, may be electrically coupled to, either via direct coupling or indirect coupling for example, the measurement circuit 90 of the meter so as to obtain data originated in the meter.

The data concentration device 100 is capable of wireless communication using a first communication standard and capable of wireless communication with a communication network using a second communication standard, e.g., the communication network 5. The data acquiring devices 200 are configured to be capable of wireless communication using the first communication standard. The data concentration device 100 differs from the data acquiring devices 200 in that the data concentration device 100 is configured to be operable as a base station or gateway to allow wireless communication using the first communication standard for the data acquiring devices 200 selectively so as to receive data from or transmit data to the data acquiring devices 200 physically attached to the other meters (e.g., one or more from meters 12_1 to 12_N (where N>2) or other meters) via radio links using the first communication standard, indicated by L1 in FIG. 1A. For example, the data concentration device 100 is configured to allocate radio resources for a radio cell covering a region, for example, a portion of or one or more customer sites, such as one or more buildings or factories. The first communication standard may be a low-power network protocol, for example, a protocol based on Weightless or other suitable low-power network protocol to provide bidirectional communication between a data concentration device and a data acquiring device.

The data concentration device 100 can communicate with the communication network through wireless communication using the second communication standard so as to transmit data, obtained from the meter 11 or the data acquiring devices 200, to the desired destination. For example, when there is data from the meter 11 to be sent, the data concentration device 100 transmits a first message to the communication network via radio links using the second communication standard, indicated by L2 in FIG. 1A, and then to, for example the server 9, wherein the first message includes the data and an indicator indicating that the data originates in the first meter so that the source of the data can be recognized by the server 9.

The data concentration device 100 selectively allows wireless communication using the first communication standard for at least one of the data acquiring devices 200. The data acquiring device(s) 200, as being allowed for uplink transmission, is enabled to transmit data of the corresponding meter to the data concentration device 100. The data concentration device 100, when receiving the corresponding data, transmits a second message to the communication network via a radio link using the second communication standard, indicated by L2 in FIG. 1A and then to, for example, the server 9, wherein the second message includes the second data and an indicator indicating that the second data originates in the second meter so that the source of the second data can be recognized by the server 9.

Figure 1B:
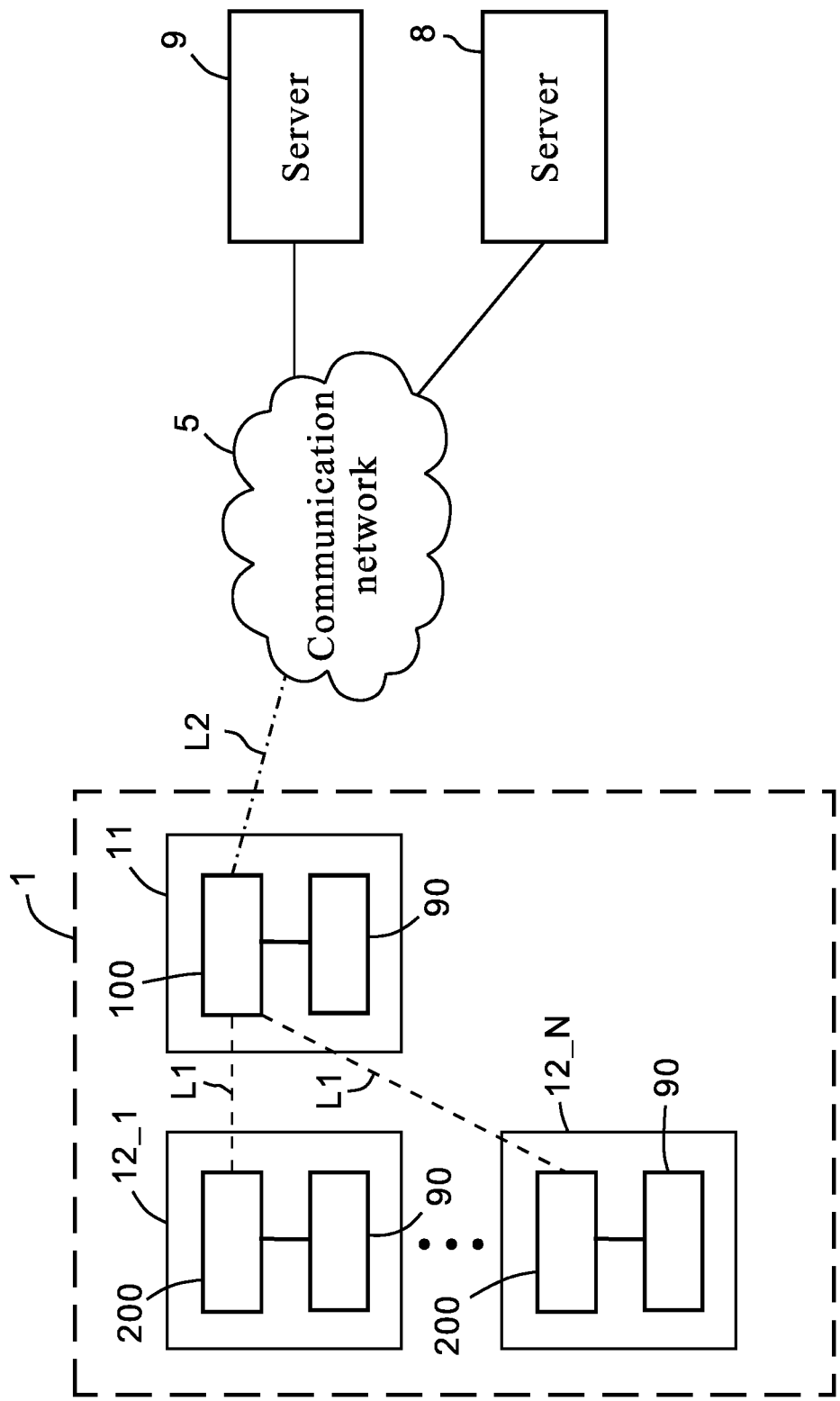
FIG. 1B is a schematic diagram illustrating a system for advanced metering employed in an implementation of an advanced metering infrastructure, according to another embodiment.

Referring to FIG. 1B, a system for advanced metering employed in an implementation of an advanced metering infrastructure is illustrated according to another embodiment. The implementation of the advanced metering infrastructure according to the embodiments of FIGS. 1A and 1B differs in the implementation of the data concentration device 100. The data concentration device 100 of FIG. 1B is configured to implement, among other things, the functionality including a lower portion of the protocol stack of the first communication standard, for example at least including the function of the physical layer, as compared with the data concentration device 100 of FIG. 1A being configured to implement, among other things, the functionality including the protocol stack of the first communication standard and radio resource scheduling, for example. In FIG. 1B, the data concentration device 100 communicates with the communication network 5 via the radio link L2 so as to send data to or receive data (e.g., protocol data) from a server 8 which implements the functionality of an upper portion of the protocol stack of the first communication standard, including the radio resource management layer with radio resource scheduling, for example, in terms of software. In this manner, the data concentration device 100 of FIG. 1B can be viewed virtually as a base station or gateway for the first communication standard, which means that, though the data concentration device 100 in FIG. 1B serves as a base station or gateway from the perspective of the data acquiring devices 200, some base station functionality, including radio resource scheduling, are not actually executed in the data concentration device 100 in FIG. 1B.

The implementation based on FIG. 1B will facilitate management and maintenance of the functionality of base stations or gateways, in terms of software, in a server remotely located, such as a cloud server. The management and maintenance will benefit from the implementation of the virtual base station, especially in some scenarios based on FIG. 1B with a plurality of the data concentration devices deployed for communicating with respective groups of the data acquiring devices.

As in the above embodiments of FIG. 1A or 1B, the data concentration device 100 is configured to be physically attached to the meter 11 to perform the functionality of data acquiring and a base station, without occupying additional location outside the meter 11 for radio coverage according to the first communication standard. Hence, the system for advanced metering of FIG. 1A or 1B will facilitate the implementation of the advanced metering infrastructure without using a conventional gateway or base station dedicatedly mounted on towers or poles, or buildings to provide radio coverage. In this way, there is no need for expending the resources and costs on deployment of the conventional gateway devices or base stations which should be mounted on towers, poles, buildings and so on, and thus the advanced metering infrastructure can be implemented in a reduced complexity and simplified form. In addition, the data concentration device 100 which is physically attached to the meter 11 to obtain the meter's data can also save the radio resources for the first communication standard, as compared to the conventional approach where a base station located outside the meters is required in order to send their respective data via wireless communication using the first communication standard. In other scenarios, the usage of the system for advanced metering according to an embodiment of the disclosure can also lead to the implementation of the advanced metering infrastructure in a simplified manner even though the conventional gateways or base stations are still employed.

In some embodiments, the data concentration device 100 is configured to be operable in one of a plurality of modes. The modes at least include a first mode and a second mode. In the first mode, the data concentration device 100 is configured to serve as a device for data acquiring that enables wireless communication using the first communication standard and disables wireless communication using the second communication standard (e.g., mobile communication for 4G). For example, the data concentration device 100 in the first mode is configured to serve as a device for data acquiring that enables wireless communication using the first communication standard (e.g., a low-power communication network standard, such as Weightless), having the functionality similar to that of a data acquiring device 200 as exemplified above. In the second mode, the data concentration device 100 is configured to serve as a base station or gateway that enables wireless communication using the first communication standard (e.g., a low-power communication network standard, such as Weightless) and wireless communication using the second communication standard (e.g., mobile communication for 4G), for example, as illustrated in FIG. 1A or 1B. In an example, the data concentration device 100 in the second mode is configured to serve as a base station of the first communication standard, such as a Weightless base station, that also enables wireless communication using the second communication standard (e.g., mobile communication for 4G). Alternatively, the data concentration device 100 in the second mode is configured to serve as a gateway that connects the data acquiring devices 200 and the data concentration device 100 itself to the communication network 5, such as a Weightless-to-4G gateway.

In some embodiments, the data concentration device 100 can be configured to operate in one of the modes by default or dynamically in response to a command or any changes in conditions or operations. For example, the data concentration device 100, when starting up or in some other situations, is operable to search for any communication device serving as a base station or gateway which provides a wireless link using the first communication standard, e.g., by finding any wireless broadcast channel providing system information for a wireless link using the first communication standard. When the data concentration device 100 finds and links to the communication device, the data concentration device 100 is operable in the first mode. When the data concentration device 100 does not find or fails to link to the communication device, the data concentration device 100 is operable in the second mode. In this situation that the communication device is found, the data concentration device 100 can change its corresponding mode as a data acquiring device so as to reduce its power consumption, e.g., deactivating the module or circuitry for communicating with the communication network (e.g., a mobile cellular station for 4G), due to redundancy. The communication device in the above example may be another data concentration device operating in the second mode, or a base station or gateway which provides a wireless link using the first communication standard, or a base station or gateway which provides a wireless link using the first communication standard and may further communicate with the communication network using the second communication standard. It is noted that the implementation of the data concentration device is not limited to the above examples.

In an embodiment, the data concentration device 100 is powered by the meter 11 and the data acquiring devices 200 are powered by the meters 12_1 to 12_N. For example, the meters 11-12_N are electricity meters.

In another embodiment, the data concentration device 100 and the data acquiring devices 200 can be implemented as being battery-powered. For example, the meters 11-12_N are water meters, gas meters or other meters that may have insufficient or no power provision for the data concentration device 100 or the data acquiring devices 200. In such a situation, the system for advanced metering, as shown in FIG. 1A or 1B, facilitates the implementation of the advanced metering infrastructure with reduced complexity and lowered powering dissipation.

Some embodiments for implementation of the data concentration device 100 and the data acquiring device 200 will be provided in the following.

Figure 2A:
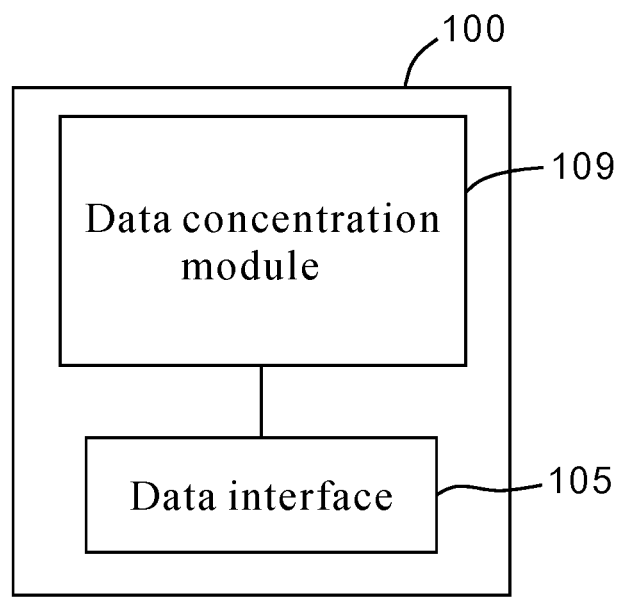
FIG. 2A is a block diagram illustrating a data concentration device according to an embodiment.

Referring to FIG. 2A, an embodiment of the data concentration device 100 is illustrated. As shown in FIG. 2A, a data concentration device 101 includes a data interface 105 and a data concentration module 109.

The data interface 105 is capable of being electrically coupled to a first meter, for example, electrically coupling or connected to the measurement circuit 90 of the meter 11, as illustrated in FIG. 1A or 1B, to obtain first data from the first meter. For example, the data interface 105 may be implemented using any data interface, such as an interface compliant with universal asynchronous receiver/transmitter (UART) or other suitable data interface. In another example, the data interface 105 can be implemented to further transmit a power signal to the data concentration device 101. In a further example, a power signal supplied by the data interface 105 can be provided to the data concentration device 100.

The data concentration module 109, electrically coupled to the data interface 105, is capable of wireless communication of a first communication standard and capable of wireless communication with a communication network using a second communication standard, e.g., the communication network 5. The data concentration module 109 is capable of performing the functionality regarding communications with the measurement circuit 90, the data acquiring device 200, and the communication network, as exemplified related to the embodiments of FIG. 1A or 1B above.

Figure 2B:
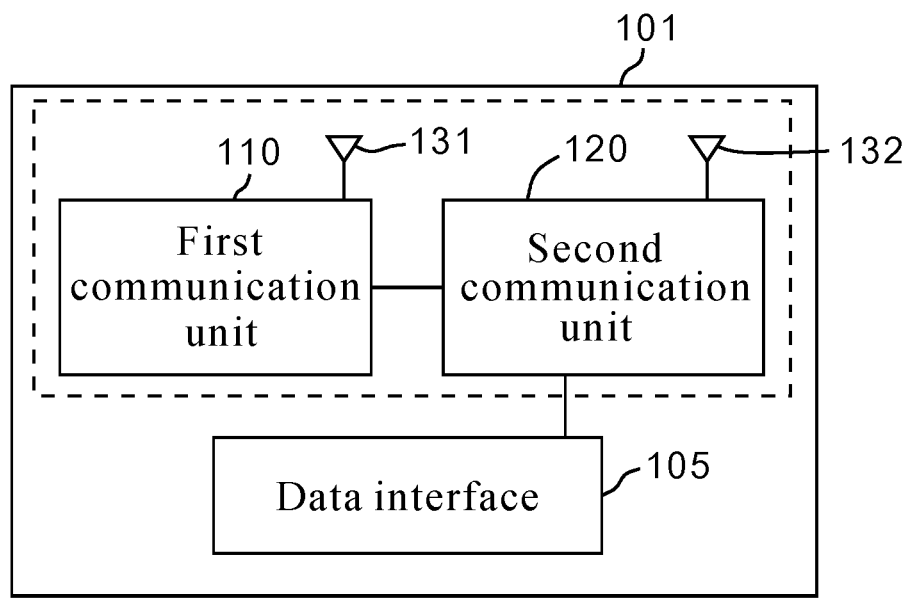
FIG. 2B is a block diagram illustrating a data concentration device according to an embodiment.
Figure 2C:
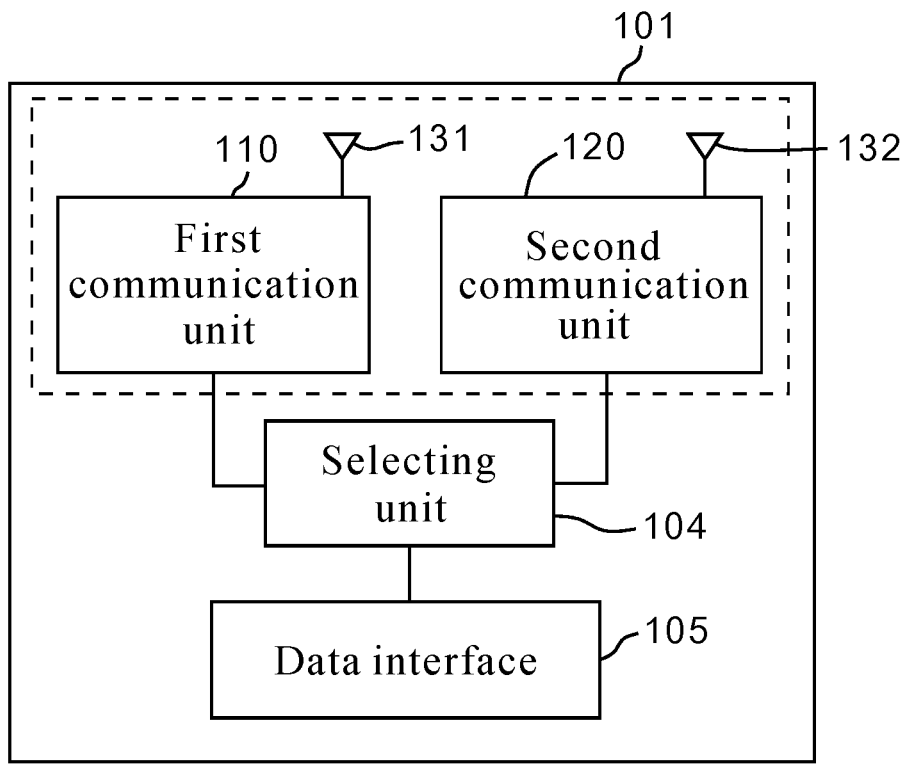
FIG. 2C is a block diagram illustrating a data concentration device according to another embodiment.

Referring to FIG. 2B, an embodiment of the data concentration device 100 is illustrated. As shown in FIG. 2B, a data concentration device 101 includes a data interface 105, a first communication unit 110, and a second communication unit 120. The first communication unit 110 and second communication unit 120 in FIG. 2B can be viewed as an embodiment of the data concentration module 109 in FIG. 2A. Referring to FIG. 2C, another embodiment of the data concentration device 100 is illustrated. As shown in FIG. 2C, the data interface 105, the first communication unit 110, and the second communication unit 120 are electrically coupled through a selecting unit 104, such as using a multiplexer or any suitable circuit. In FIG. 2C, the selecting unit 104 is utilized for passing the data from the meter (e.g., meter 11) and data from the first communication unit 110 to the second communication unit 120, and for routing the data received from the second communication unit 120 to the meter (e.g., meter 11) or the first communication unit 110. The implementation of the data concentration device is not limited to the above examples.

The first communication unit 110 is capable of wireless communication using the first communication standard, for example, to operate as a base station or gateway for allocating radio resources for a radio cell of the first communication standard in order to provide bidirectional communication. The second communication unit 120, electrically coupled to the data interface 105 and the first communication unit 110, is capable of wireless communication with the communication network (e.g., communication network 5) using the second communication standard. The second communication unit 120 of the data concentration device 101 transmits a first message including the first data and indicating that the first data originates in the first meter to the communication network. The first communication unit 110 of the data concentration device 101 selectively allows uplink transmission for the data acquiring device 200 so as to enable the data acquiring device 200 to transmit the second data. The first communication unit 110 of the data concentration device 101, when receiving the second data, transmits a second message including the second data and indicating that the second data originates in the second meter to the communication network through the second communication unit 120.

Figure 2D:
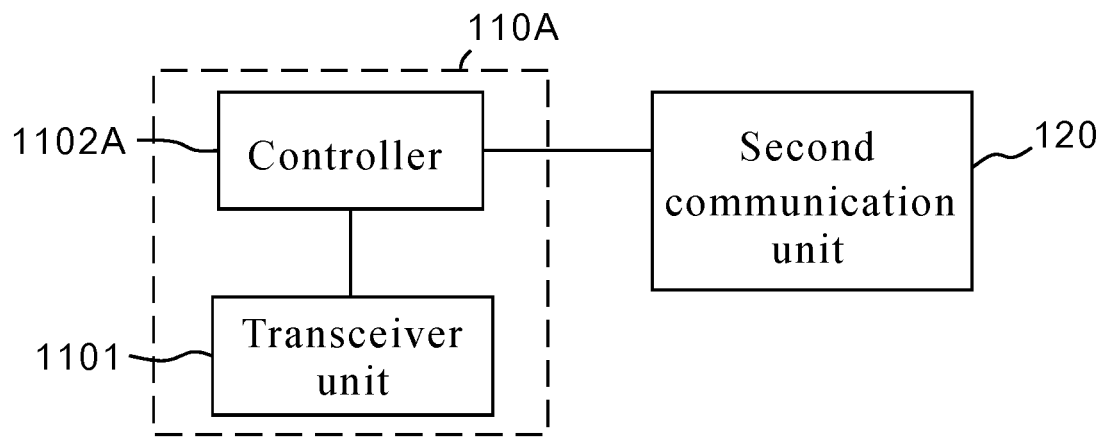
FIG. 2D is a block diagram illustrating an embodiment of a data concentration module according to a data concentration device of FIG. 1A.

According to the embodiment of FIG. 1A, the first communication unit 110 of FIG. 2B or 2C may be realized by circuitry and/or software to implement the functionality of a base station or gateway according to the first communication standard. In an example of the first communication unit 110, as illustrated in FIG. 2D, a first communication unit 110A includes a transceiver unit 1101 and a controller 1102A electrically coupled or connected to the transceiver unit 1101. In a case where the first communication standard is Weightless, the transceiver unit 1101 includes circuitry to implement the physical layer and the controller 1102A includes circuitry and/or software to implement the functionality including the baseband layer (BB), link layer (LL), and radio resource management layer (RRM) with radio resource scheduling according to the protocol stack of Weightless, for instance. The first communication unit 110A, by way of the transceiver unit 1101, converts a radio signal received over the air into corresponding protocol data (e.g., which may include data from other meter(s)) to be processed by the controller 1102A, or converts protocol data from the controller 1102A into a radio signal to be transmitted over the air.

The second communication unit 120 sends data from the controller 1102A of the first communication unit 110A to the server 9 via the communication network 5, or receives data from the server 9 via the communication network 5 and then sends the received data to the controller 1102A of the first communication unit 110A. The second communication unit 120 may include a radio modem and a controller so as to implement the wireless communication using the second communication standard, such as mobile communication standard for 3G, 4G, or 5G or any other suitable standard. As compared with the second communication unit 120 implementing shorter range communications at a higher bit rate, the first communication unit 110 has the benefits of using the first communication standard intended for longer range communications at a lower bit rate so as to have lower power consumption.

According to the embodiment of FIG. 1B, the first communication unit 110 includes circuitry to implement functionality including a lower portion of the protocol stack of the first communication standard, for example, at least including the physical layer thereof, or the physical layer with a part of other layer(s). In this manner, a relatively upper portion of the protocol stack such as radio resource management layer (RRM) with radio resource scheduling is to be implemented in the server 8.

Figure 2E:
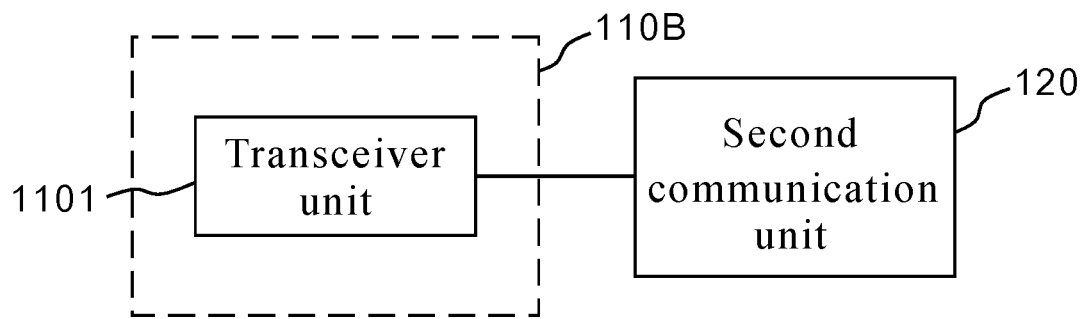
FIG. 2E is a block diagram illustrating an embodiment of a data concentration module according to a data concentration device of FIG. 1B.

In an example of the first communication unit 110 according to the embodiment of FIG. 1B, a first communication unit 110B, as illustrated in FIG. 2E, includes a transceiver unit 1101 to implement a lower portion of the protocol stack of the first communication standard, wherein the lower portion indicates the physical layer thereof. In this case, the server 8 can be implemented to include software to implement the functionality including the baseband layer (BB), link layer (LL), and radio resource management layer (RRM) according to the protocol stack of Weightless, for example, with radio resource scheduling. In FIG. 2E, the first communication unit 110B, by way of the transceiver unit 1101, converts a radio signal received over the air into corresponding protocol data (e.g., which may include data from other meter(s)) to be processed by the server 8, or converts protocol data received by the second communication unit 120 into a radio signal to be transmitted over the air. The second communication unit 120 sends data (e.g., including protocol data for the first communication standard) from the transceiver unit 1101 of the first communication unit 110B to the server 8 via the communication network 5, or receives data (e.g., including protocol data for the first communication standard) from the server 8 via the communication network 5 and then sends the received data to the transceiver unit 1101 of the first communication unit 110B.

Figure 2F:
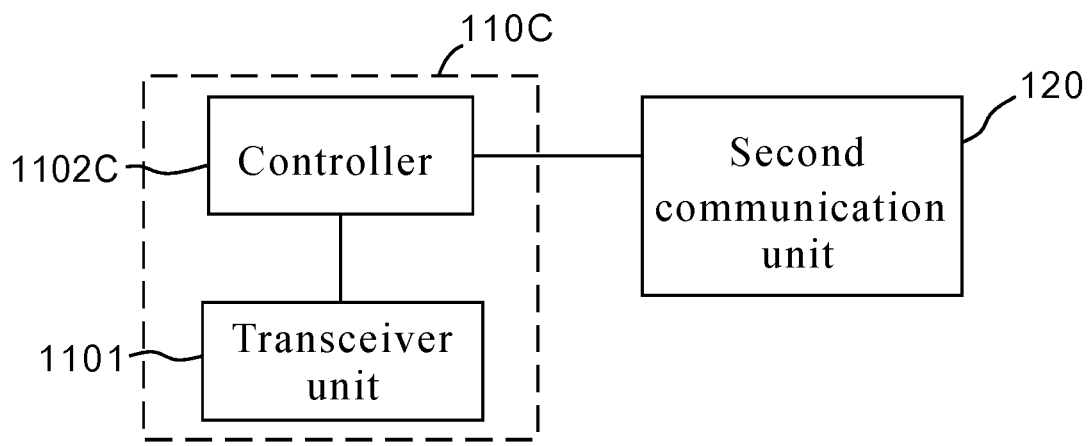
FIG. 2F is a block diagram illustrating another embodiment of a data concentration module according to a data concentration device of FIG. 1B.

In another example, as illustrated in FIG. 2F, a first communication unit 110C includes a transceiver unit 1101 and a controller 1102C so as to implement a lower portion of the protocol stack of the first communication standard, wherein the lower portion includes the physical layer and a lower part of the baseband layer thereof. In this case, the server 8 can be implemented to include software to implement the functionality including an upper part of the baseband layer, the link layer, and the radio resource management layer according to the protocol stack of Weightless, for example, with radio resource scheduling. In FIG. 2F, the first communication unit 110C, by way of the transceiver unit 1101, converts a radio signal received over the air into corresponding protocol data (e.g., which may include data from other meter(s)) to be processed by the controller 1102C, or converts protocol data from the controller 1102C into a radio signal to be transmitted over the air. The second communication unit 120 sends data (e.g., including protocol data for the first communication standard) from the controller 1102C of the first communication unit 110C to the server 8 via the communication network 5, or receives data (e.g., including protocol data for the first communication standard) from the server 8 via the communication network 5 and then sends the received data to the controller 1102C of the first communication unit 110C.

Although Weightless is taken in the above examples, the implementation of the data concentration device is not limited to the above examples. Thus, any communication standard suitable for implementing the first communication standard can be utilized or the protocol stack of the suitable communication standard can be split functionally for the examples in FIG. 2D-2F in similar or other manners.

In FIG. 2B, a first antenna 131 and a second antenna 132 for the first communication unit 110 and second communication unit 120 respectively are illustrated. In an example, the first antenna 131 and 132 can be replaced by an antenna supporting different frequency bands. In addition, the data interface 105, the first communication unit 110, and the second communication unit 120 can be implemented on a circuit board so that the data concentration device 101 has a form factor which is fitted to be physically attached to the meter 11. Certainly, the implementation of the data concentration device is not limited to the above examples.

Figure 3A:
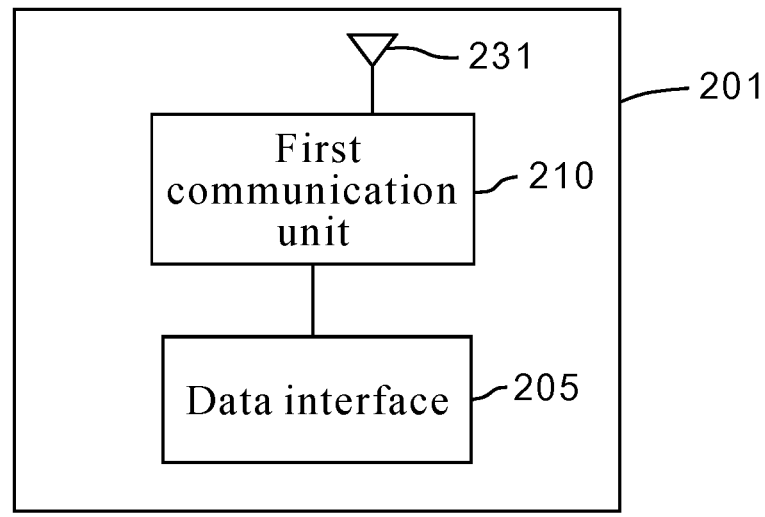
FIG. 3A is a block diagram illustrating a data acquiring device according to an embodiment.
Figure 3B:
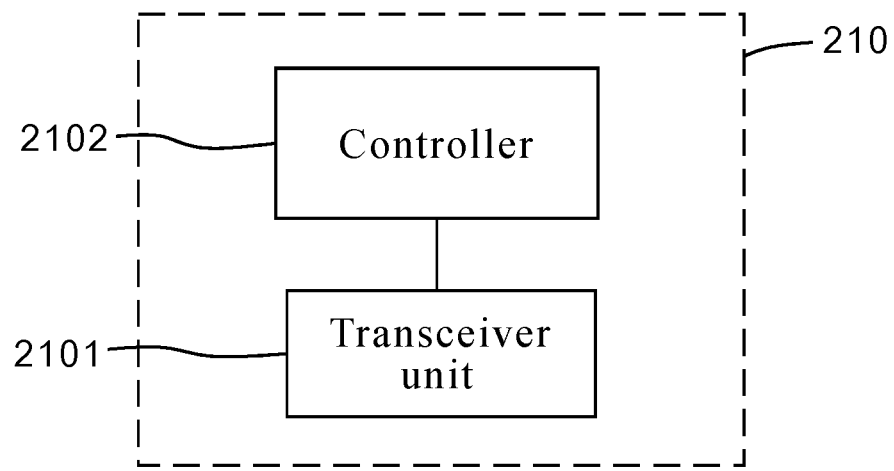
FIG. 3B is a block diagram illustrating a first communication unit of FIG. 3A according to an embodiment.

Referring to FIG. 3A, an embodiment of the data acquiring device 200 is illustrated. As shown in FIG. 3A, a data acquiring device 201 includes a data interface 205 and a first communication unit 210. The data interface 205 may be realized in a manner similar to the data interface 105. The first communication unit 210 may be implemented according to the first communication standard. In FIG. 3A, a first antenna 231 for the first communication unit 210 is illustrated and may be implemented similarly as the first antenna 131. Referring to FIG. 3B, the first communication unit 210, for example, includes a transceiver unit 2101 and a controller 2102. The transceiver unit 2101 can be implemented similarly as the transceiver unit 1101. The controller 2102 can be implemented similarly as the controller 1102A of FIG. 2D except at least that radio resource scheduling is not performed in the controller 2102. Certainly, the implementation of the data acquiring device is not limited to the above examples.

Figure 4:
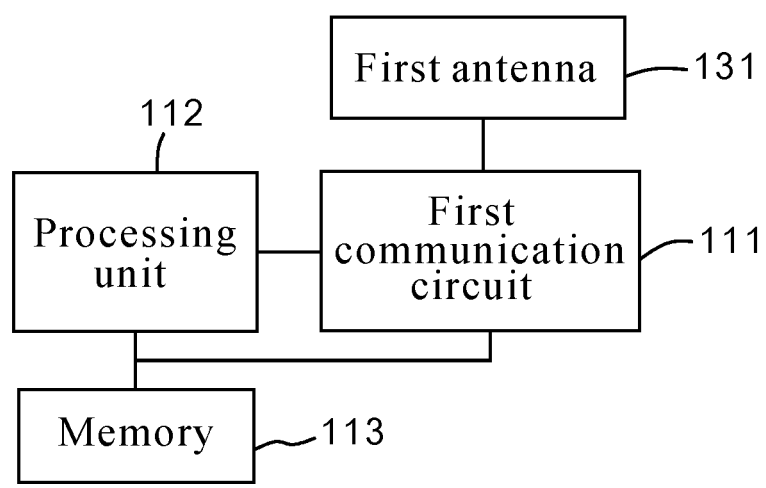
FIG. 4 is a block diagram illustrating a first communication unit according to an embodiment.

Referring to FIG. 4, an embodiment of the first communication unit is illustrated. As shown in FIG. 4, the first communication unit includes a first communication circuit 111 and a processing unit 112 electrically coupled to the first communication circuit 111. The processing unit 112 may be a processor, microcontrollers, a digital signal processor, field programmable gate array (FPGAs), an application specific integrated circuit (ASIC), programmable logic devices (PLDs), controllers, state machines, gated logic, discrete hardware components, dedicated hardware finite state, or any other suitable entities that can perform calculations or other manipulations of information. The first communication circuit 111 can be implemented to be a circuit for implementation of a base station or gateway using a communication protocol of the first communication standard, such as Weightless protocol or other suitable low-power network protocol. The first communication circuit 111 can be implemented to include circuitry for implementation including a physical layer of the first communication standard. The other protocol layers of the first communication standard can be implemented by hardware and/or software performed by the processing unit 112. The first communication unit in FIG. 4 can be implemented to further include the first antenna 131 coupled to the first communication circuit 111 and a memory 113 for storing data used in the first communication unit. The first communication unit in FIG. 4 can be configured or modified to implement the first communication unit in any one of FIG. 2A-2F or the first communication unit 210 in FIG. 3A or 3B. Certainly, the implementation of the first communication unit is not limited to the above examples.

Figure 5:
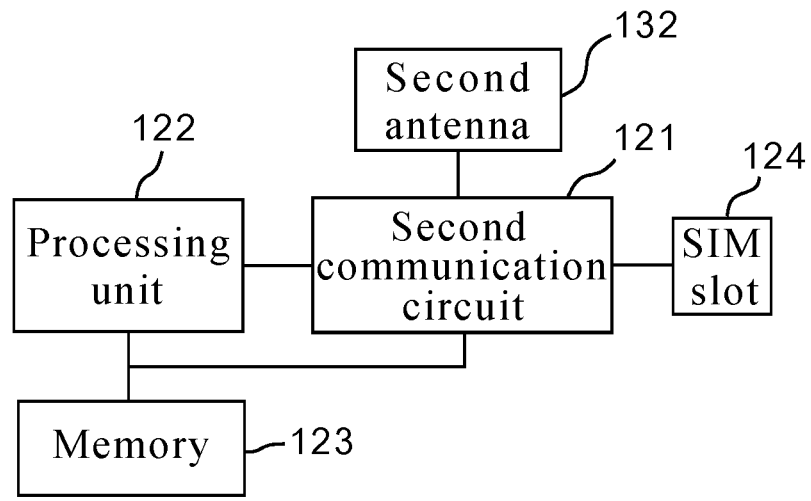
FIG. 5 is a block diagram illustrating a second communication unit according to an embodiment.

Referring to FIG. 5, an embodiment of the second communication unit is illustrated. As shown in FIG. 5, the second communication unit includes a second communication circuit 121 and a processing unit 122 electrically coupled to the second communication circuit 121. The processing unit 122 may be a processor, microcontrollers, a digital signal processor, a controller or other circuit as exemplified for the processing unit 112. The second communication circuit 121 can be implemented to be a circuit for implementation of the second communication standard, such as mobile communication standard for 3G, 4G, or 5G or other suitable protocol. The second communication circuit 121 can be implemented to include circuitry for implementation including a physical layer of the second communication standard. The other protocol layers of the second communication standard can be implemented by hardware and/or software performed by the processing unit 122. The second communication unit in FIG. 5 may further include the second antenna 132 coupled to the second communication circuit 121 and a memory 123 for storing data used in the second communication unit. The second communication unit in FIG. 5 can be implemented to further include a subscriber identification module (SIM) slot 124 for insertion of a SIM card. The SIM slot 124 is optional and may be selectively included according to the requirement of the second communication standard. Certainly, the implementation of the second communication unit is not limited to the above examples.

Figure 6:
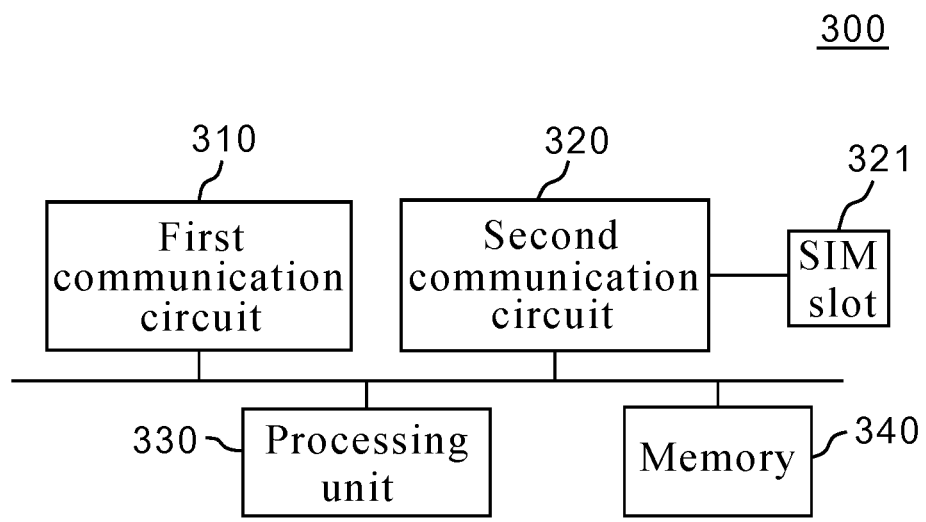
FIG. 6 is a block diagram illustrating a data concentration device according to another embodiment.

Referring to FIG. 6, another embodiment of the data concentration device 100 is shown. As shown in FIG. 6, a data concentration device 300 includes a first communication circuit 310, a second communication circuit 320, and a processing unit 330. The embodiment in FIG. 6 can be viewed as an embodiment of the data concentration module 109 in FIG. 2A. The first communication circuit 310 and the second communication circuit 320 can be implemented similarly as the first communication circuit 111 and the second communication circuit 121 in FIGS. 4 and 5 respectively, or in other manners. The data concentration device 300 in FIG. 6 can be implemented to further include antennas (e.g., 131 and 132) or an antenna compliant with the first and second communication standards, coupled to the first communication circuit 310 and the second communication circuit 320. The data concentration device 300 in FIG. 6 may further include a data interface (e.g., 105 or 205) and a memory 340 for storing data used in the data concentration device 300. The data concentration device 300 in FIG. 6 may further optionally include a SIM slot 321 for insertion of a SIM card.

Figure 7:
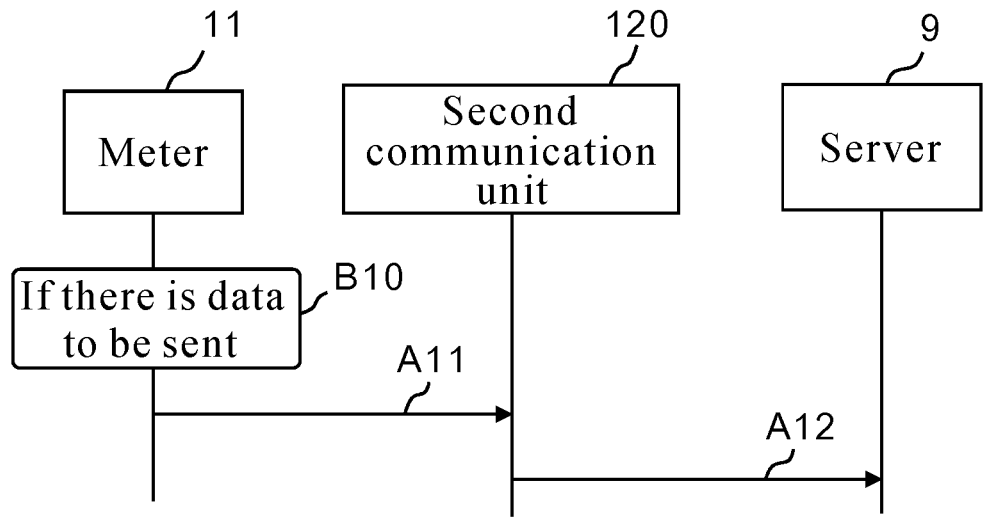
FIG. 7 is a schematic diagram illustrating uplink data multiplexing in a data concentration device according to an embodiment.
Figure 8:
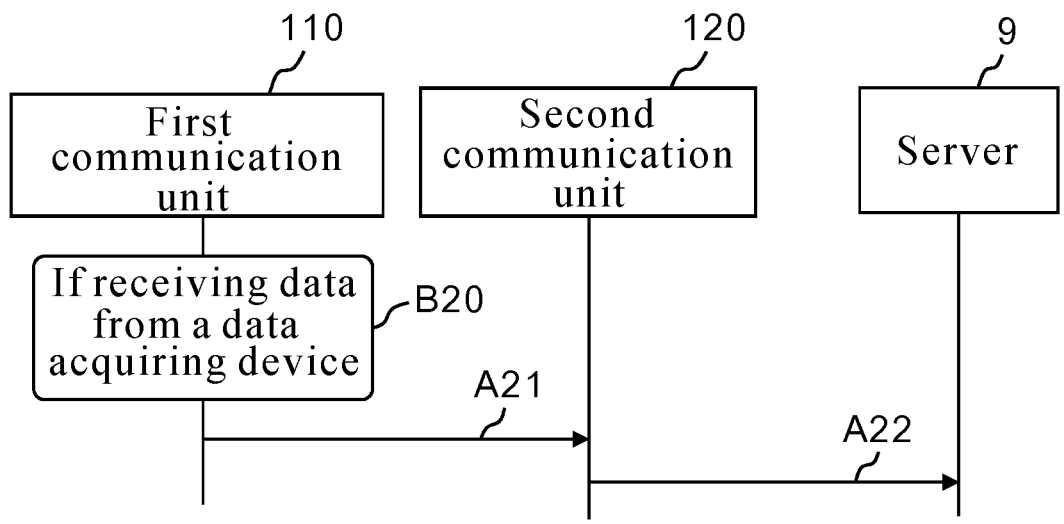
FIG. 8 is a schematic diagram illustrating uplink data multiplexing in a data concentration device according to another embodiment.

Referring to FIGS. 7 and 8, examples of uplink data multiplexing in a data concentration device 100 are illustrated in schematic diagrams. As shown in FIGS. 7 and 8, multiplexing methods for the uplink data are provided since there are at least two types of meter data coming into the data concentration device 100. A first type of data comes from the meter (e.g., meter 11 in FIG. 1A or 1B) connected to the data concentration device 100 through a data interface, and a second type of data comes from the meters (e.g., meters 12_1 or 12_N in FIG. 1A or 1B) where data are to be sent through linking using the first communication standard. To identify the source or origin of the data coming into the data concentration device 100, an indicator indicating such as different commands, different flag values, or an identification code (e.g., ID) may be utilized and included.

As exemplified in FIG. 7, when the meter 11 has data to be sent, as indicated by a block B10, a message including the data (e.g., called METER_TX_REQ) is sent to the second communication unit 120 (or the second communication circuit 121, 320), as indicated by an arrow A11. The second communication unit 120 sends a first message including the data and a flag (e.g., called Flag_transport with value 0) to the server 9 through the communication network (e.g., communication network 5), as indicated by an arrow A12. It is noted that in the implementation according to the embodiment of FIG. 1B, the first message, which can be embedded into protocol data, and is sent to the server 8 first for protocol processing and then to the server 9.

As exemplified in FIG. 8, when the data concentration device 100 receives data from one of the data acquiring devices 200, as indicated by a block B20, the first communication unit 110 (or the first communication circuit 111, or 310) transmits a message including the received data (e.g., called METER_TRANSPORT_REQ) which is sent to the second communication unit 120 (or 121, 320), as indicated by an arrow A21. The second communication unit 120 (or 121, 320) then sends a second message including the data and a flag (e.g., Flag_transport with value 1) to the server 9 through the communication network (e.g., communication network 5), as indicated by an arrow A22. It is noted that in the implementation according to the embodiment of FIG. 1B, the second message, which can be embedded into protocol data, and is sent to the server 8 first for protocol processing and then to the server 9.

The implementation of the uplink data multiplexing in the data concentration device is not limited to the above examples. For examples, the indicator as exemplified by flag values above may be realized in other manners, such as ID, address, or meter number of the meters.

Figure 9:
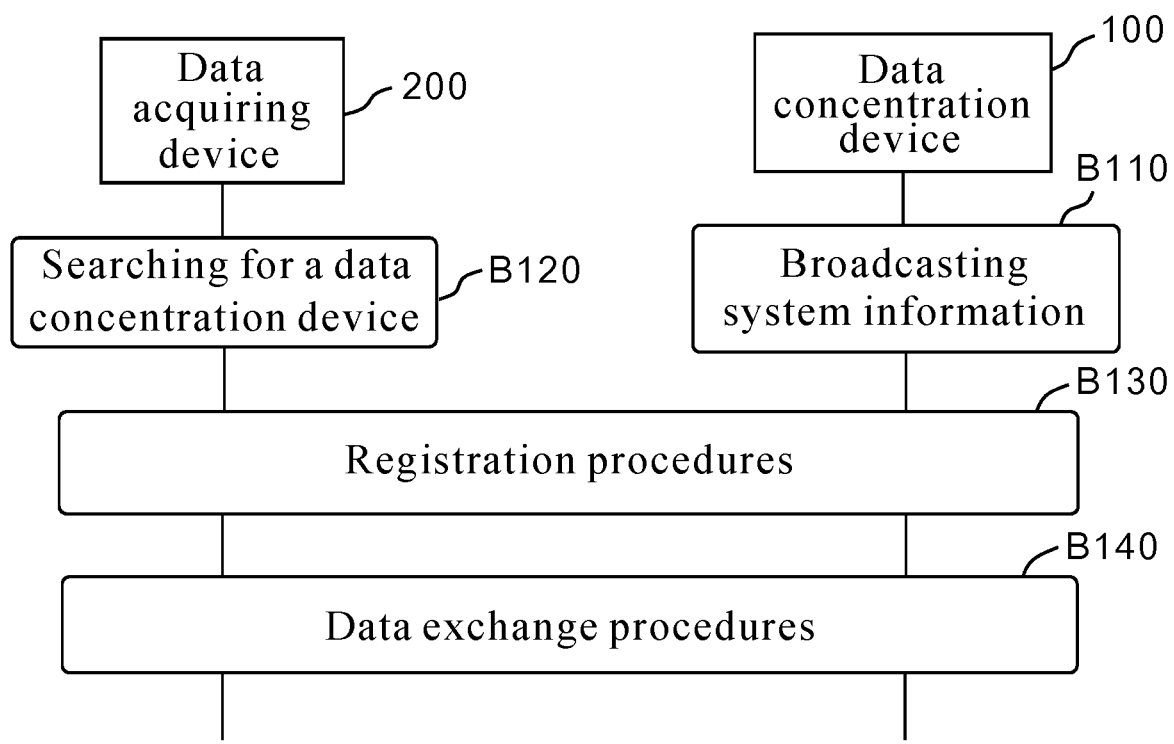
FIG. 9 is a schematic diagram illustrating communication procedures between a data concentration device and a data acquiring device according to an embodiment.

Referring to FIG. 9, communication procedures between a data concentration device 100 and a data acquiring device 200 are illustrated according to an embodiment in a schematic diagram. In this embodiment, when the data concentration device 100 is started up, as indicated by a block B110, the data concentration device 100 broadcasts system information carrying the system information, for example, a System Information Block (SIB) of Weightless standard so that any data acquiring device (e.g., 200) to be joined to a radio cell controlled by the data concentration device 100 will have enough information to link to the data concentration device 100.

As indicated by a block B120 in FIG. 9, when a data acquiring device 200 initializes, the data acquiring device 200 will search for a data concentration device, for example, searching for a radio cell of a data concentration device or a system information broadcast by a data concentration device (e.g., 100) with good signal quality. When the data acquiring device 200 finds the data concentration device 100, for example, the data acquiring device 200 will start registration procedures, as indicated by a block B130, to link to the data concentration device 100 or join to the radio cell thereof. Once the registration procedures are done, the data concentration device 100 will allocate radio resources for uplink and/or downlink transmission to the linked data acquiring device(s) 200, so that the data concentration device 100 and the linked data acquiring device(s) 200 can perform data exchange procedures, as indicated by a block B140 in FIG. 9.

Figure 10:
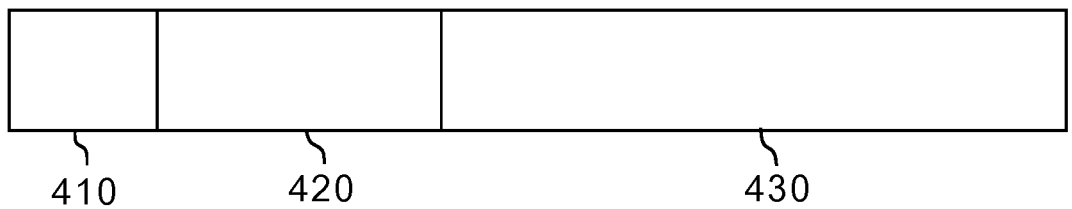
FIG. 10 is a schematic diagram illustrating an example of a frame.

Referring to FIG. 10, a schematic diagram illustrates an example of a frame which can be utilized in the first communication standard. As shown in FIG. 10, a frame 400, for example, includes a plurality of sections including a first section 410 for system information blocks (SIB), a second section 420 for resource allocation for uplink and downlink, a third section 430 for available resources for uplink and downlink. For example, the first section 410 indicates SIB and carries the broadcasted system information such as frame duration, what the modulation and coding scheme (MCS) setting is to retrieve the resource allocation information. For example, the second section 420 indicates resource allocation and carries the resource allocation information of how resources are allocated, such as where the resource is allocated, which data acquiring device the resource is dedicated for, and how the resource is modulated and coded (e.g., MCS setting). For example, the third section 430 is utilized for allocated and contended uplink transmissions and allocated downlink transmissions. Certainly, the implementation of the present disclosure is not limited to the above examples.

As mentioned above, the data concentration device 100 can be implemented to be capable of operating as a base station or gateway, for example, to allocate radio resource for a radio cell. Accordingly, a data acquiring device linked to the data concentration device 100, for example, by way of the procedures as illustrated in FIG. 9, will not transmit or receive data until the data concentration device 100, either actually as in FIG. 1A or virtually as in FIG. 1B, allocates, or schedules, uplink or downlink radio resources for the linked data acquiring device. The following provides embodiments for radio resource scheduling for uplink or downlink.

Figure 11:
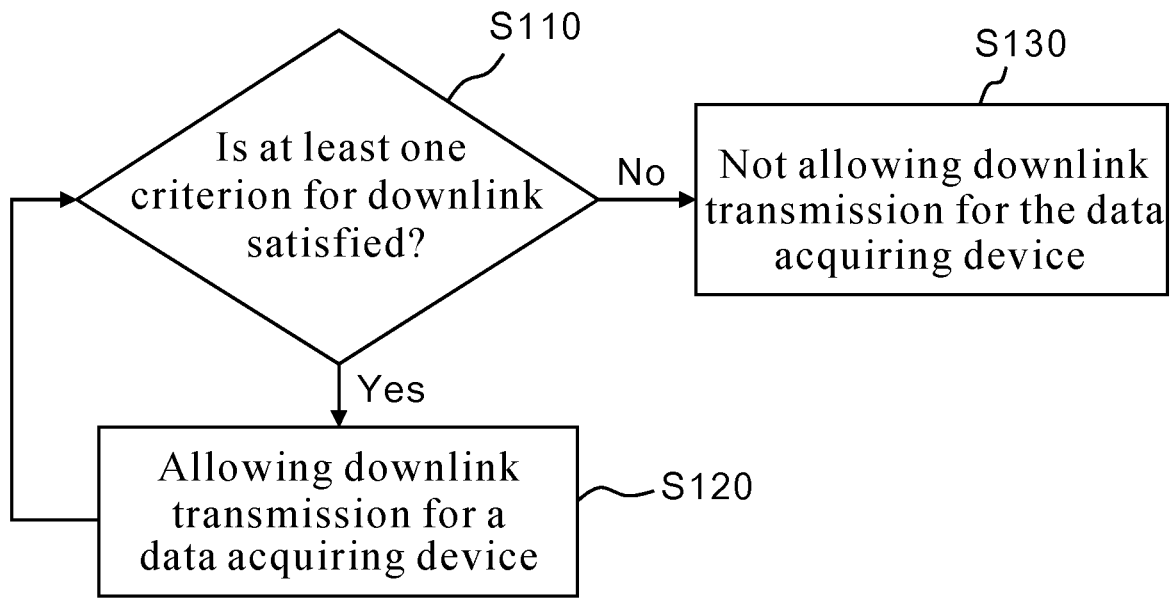
FIG. 11 is a flowchart illustrating a method of radio resource scheduling for downlink transmission according to an embodiment.

Referring to FIG. 11, a method of radio resource scheduling for downlink transmission is illustrated according to an embodiment in a flowchart. In this embodiment, the method determines whether to allow downlink transmission for one or more data acquiring devices according to one or more factors as will be exemplified in the following. The method may be implemented actually by the data concentration device according to FIG. 1A or virtually by the data concentration device in cooperation with the server 8 according to FIG. 1B.

Referring to FIG. 11, the method, as indicated by step S110, determines whether at least one criterion is satisfied, such as whether there is downlink data pending to be sent to a data acquiring device.

The method proceeds to step S120 if the at least one criterion in step S110 is satisfied. As indicated by step S120, the method allows downlink transmission for the data acquiring device. For example, the method can be implemented to allocate (or assign) one or more slots for downlink transmission so as to send the downlink data to the data acquiring device. If the at least one criterion in step S110 is not satisfied, step S130 may be performed.

In an example of step S110, the method determines whether there is downlink data pending to be sent to a data acquiring device and number of allocated downlink time slots in a frame, as exemplified in FIG. 10, is less than a downlink allocation number threshold.

In other examples of step S110, the method may take more criteria in the determination as to whether to allow downlink transmission. For example, the method can be implemented to determine whether (a) there is downlink data pending to be sent to a data acquiring device, (b) the number of allocated downlink time slots in the radio resource is less than a downlink allocation number threshold, and (c) the number of downlink resource allocation information elements is less than a downlink resource allocation threshold. The method allows downlink transmission for the data acquiring device if the criteria (a), (b), and (c) are all satisfied. For the criterion (c) above, for instance, the number of downlink resource allocation information element indicates the number of downlink resource allocation information elements that are carried in the frame (e.g., the second section 420 of the frame in FIG. 10); and the downlink resource allocation threshold indicates a maximum number of downlink resource allocation information elements that are allowed to be carried in the frame. For example, a downlink resource allocation information element describes information such as a destination (such as an address, ID, or flag) of an end device (e.g., a data acquiring device), number of time slots allocated to the destination, or modulation and coding scheme for the destination. Certainly, the implementation of the data concentration device and the method is not limited to the above examples.

In step S130, the method will not allow downlink transmission, e.g., no downlink time slots being allocated, for the data acquiring device if it is determined that one or more criteria in step S110 is not satisfied.

Figure 12:
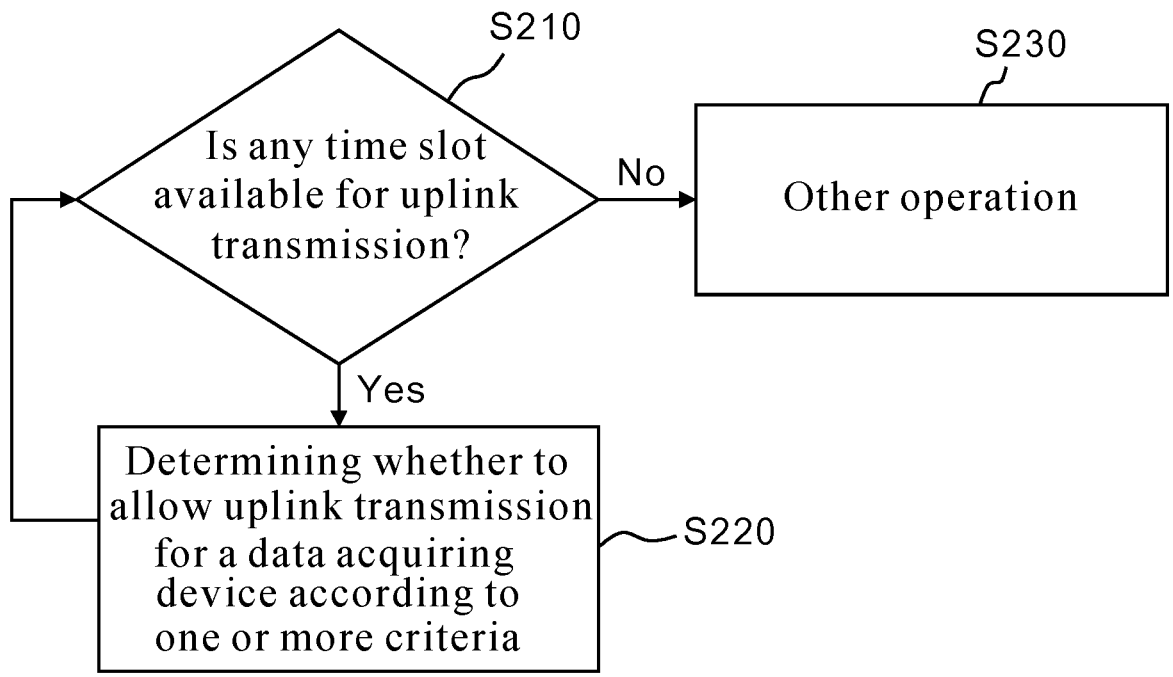
FIG. 12 is a flowchart illustrating a method of radio resource scheduling for uplink transmission according to an embodiment.

Referring to FIG. 12, a method of radio resource scheduling for uplink transmission is illustrated according to an embodiment. In this embodiment, the method determines whether to allow uplink transmission for a data acquiring device according to one or more factors as will be exemplified in the following. The method can be also implemented actually by the data concentration device according to FIG. 1A or virtually by the data concentration device in cooperation with the server 8 according to FIG. 1B.

As indicated by step S210 in FIG. 12, the method determines whether any time slot is available for uplink transmission. For example, the time slot available for uplink transmission is the remaining time slots available excluding the allocated downlink time slots, or further excluding a minimum number of reserved time slots, for example, for contended access uplink resource.

If the method determines that there is a time slot available for uplink transmission, the method proceeds to step S220.

As indicated by step S220, the method determines whether to allow uplink transmission for a data acquiring device according to one or more criteria.

If it is determined that there is no time slot available for uplink transmission, the method proceeds to step S230, for example, to wait for an available time slot for uplink transmission or to perform other operations for resource scheduling.

In an example of step S220, the method allows uplink transmission for a data acquiring device according to a corresponding priority of the data acquiring device. If there are two or more data acquiring devices to be scheduled, the higher priority data acquiring device will be scheduled first. For instance, in FIG. 1A, if it is supposed that the data acquiring device 200 physically attached to the meter 12_1 has a higher priority than that of the data acquiring device 200 physically attached to the meter 12_N, the method can be implemented to allow uplink transmission, for example, by allocating one or more uplink time slots, for the data acquiring device 200 physically attached to the meter 12_1. If the values of priority of the data acquiring devices 200 are the same, the method can be implemented to allow uplink transmission, for example, in sequence or in an arbitrary manner.

In another example of step S220, the method can allow uplink transmission for a data acquiring device according to a waiting time of the data acquiring device. In another example, the waiting time of the data acquiring device is the waiting time to not be scheduled with respect to a corresponding data acquiring device, and the longer time the data acquiring device is not scheduled for uplink transmission, the sooner the data acquiring device will obtain an uplink resource scheduled.

In a further example of step S220, the method can allow uplink transmission for a data acquiring device according to a corresponding priority of the data acquiring device and a waiting time of the data acquiring device. This example of step S220 may be realized by using the previous examples of step S220. For instance, in a scenario based on FIG. 1A, it is supposed that the data concentration device controls or allocates radio resource in a radio cell of N data acquiring devices (e.g., N=10), the data concentration device physically attached to a meter determines as to whether to allow uplink transmission for the N data acquiring devices physically attached to the respective meters. If one of the N data acquiring devices has a higher priority than others, the data concentration device can allow uplink transmission, for example, by allocating one or more uplink time slots, for the data acquiring device with the higher priority. If the values of priority of the N data acquiring devices are the same, the data concentration device can determine whether any of the N data acquiring devices has a corresponding waiting time which satisfies a criterion (e.g., a criterion for the waiting time to not be scheduled, as exemplified above). Conversely, in another embodiment, the data concentration device can determine whether any of the N data acquiring devices has a corresponding waiting time which satisfies a criterion first, and then determine whether any data acquiring device has a higher priority so as to allow uplink transmission. Certainly, the implementation of the method is not limited to the above examples. This example of step S220 can be implemented virtually by the data concentration device in cooperation with the server 8 according to FIG. 1B.

In another example of step S220, the method can allow uplink transmission for a specific data acquiring device when it is confirmed that uplink resource is needed at the frame for the specific data acquiring device. This condition for confirmed uplink requirement may occur in various manners. An example of such condition is that the data concentration device sends downlink data, for example, in an acknowledgement (ACK) channel, to the specific data acquiring device and then the data concentration device can confirm that the specific data acquiring device needs to send uplink data, wherein the confirmation can be made, for example, by sending an ACK back. In another example of such a condition, the data concentration device may receive an uplink resource request message from a specific data acquiring device. Based on this example with the condition satisfied, in an example, if there is still uplink resource remaining, the method (data concentration device) can assign the uplink resource (e.g., time slot(s)) to the other data acquiring device(s), for example, in a round-robin way, in sequence, or in other manner, wherein the other data acquiring device(s) is linked to the data concentration device, for example, by registration, and is not assigned uplink resource. In another example, if there is still uplink resource remaining, the data concentration device can assign the uplink resource (e.g., time slot(s)) for contended access. For example, contended access occurs when there is information to send that was not envisaged. For a terminal such as a data acquiring device, contended access requires attempting to gain radio resource to signal a desire to communicate. For a network, it requires a base station making space within a downlink frame to carry the traffic.

In some embodiments, a method of radio resource scheduling for downlink and uplink transmission can be provided based on the methods in FIGS. 11 and 12. For example, the method of radio resource scheduling may include the steps of radio resource scheduling for downlink transmission in FIG. 11 and then the steps of radio resource scheduling for uplink transmission in FIG. 12, and vice versa. To be specific, in this method of radio resource scheduling, after step S120 or step S130 in FIG. 11 is performed, the method proceeds to step S210 in FIG. 12. The steps in FIGS. 11 and 12 may be repeated or performed in any appropriate order for downlink and uplink resource scheduling.

The method exemplified above according to FIGS. 11 and 12 can be performed by using the data concentration module, the first communication unit, the first communication circuit, the controller, or the processing unit of the data concentration device based on any of the embodiments based on FIG. 1A. The method exemplified above according to FIGS. 11 and 12 can be also implemented virtually by the data concentration device in cooperation with the server 8 according to FIG. 1B.

Figure 13:
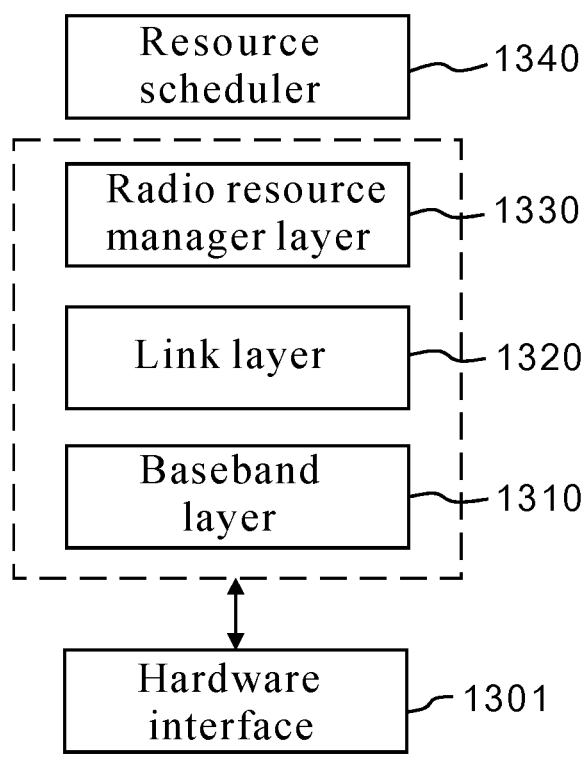
FIG. 13 is a schematic diagram illustrating software architecture for the protocol stack of the first communication standard with a resource scheduler according to the embodiment of FIG. 11 and/or 12.

FIG. 13 is a schematic diagram illustrating the software architecture for the protocol stack of the first communication standard with radio resource scheduling according to the embodiments of FIG. 11 and/or 12. Referring to FIGS. 1A, 2A, and 13, the data concentration device 100 can be implemented to have a layered software architecture as illustrated in FIG. 13 so as to be able to communicate according to the first communication standard. In various examples according to FIG. 1A, the software architecture can be distributed among one or more components capable of processing data, such as processors, controllers, and so on, of an implementation of the data concentration device, for example, the first communication unit 110, controller 1102A, or the first communication circuit 330. In various examples according to FIG. 1B, the software architecture can be distributed among one or more components capable of processing data of an implementation of the data concentration device, for example, the first communication unit 110, controller 1102C, or the first communication circuit 330, and one or more processing components, such as processors, controllers, and so on, of the server 8.

In various examples, the software architecture can include at least one protocol stack. The protocol stack, as indicated by the dashed block in FIG. 13, can be implemented to include at least three layers, each of which can contain various sublayers. For example, the protocol stack can include a baseband layer 1310, a link layer 1320, and a radio resource management layer 1330, according to the protocol stack of Weightless, for example. In FIG. 13, the software architecture further includes a resource scheduler 1340, which can implement the functions including the method of radio resource scheduling for downlink transmission based on the embodiment of FIG. 11 and/or the method of radio resource scheduling for uplink transmission based on the embodiment of FIG. 12. In some examples, the resource scheduler 1340 can be implemented by one or more program modules, embedded in the radio resource management layer 1330 or executed as software separated from the radio resource management layer 1330.

The software architecture may include a physical layer, and/or other additional layer(s). In some examples, the software architecture can further include a hardware interface 1301 between the physical layer and the communication hardware (e.g., a transceiver, radio frequency related hardware, or so on). Although described above with reference to the Weightless standard, the protocol stack(s) may support any of variety of standards and protocols that are suitable for implementing the wireless communication between the data concentration device and the data acquiring device.

Figure 14:
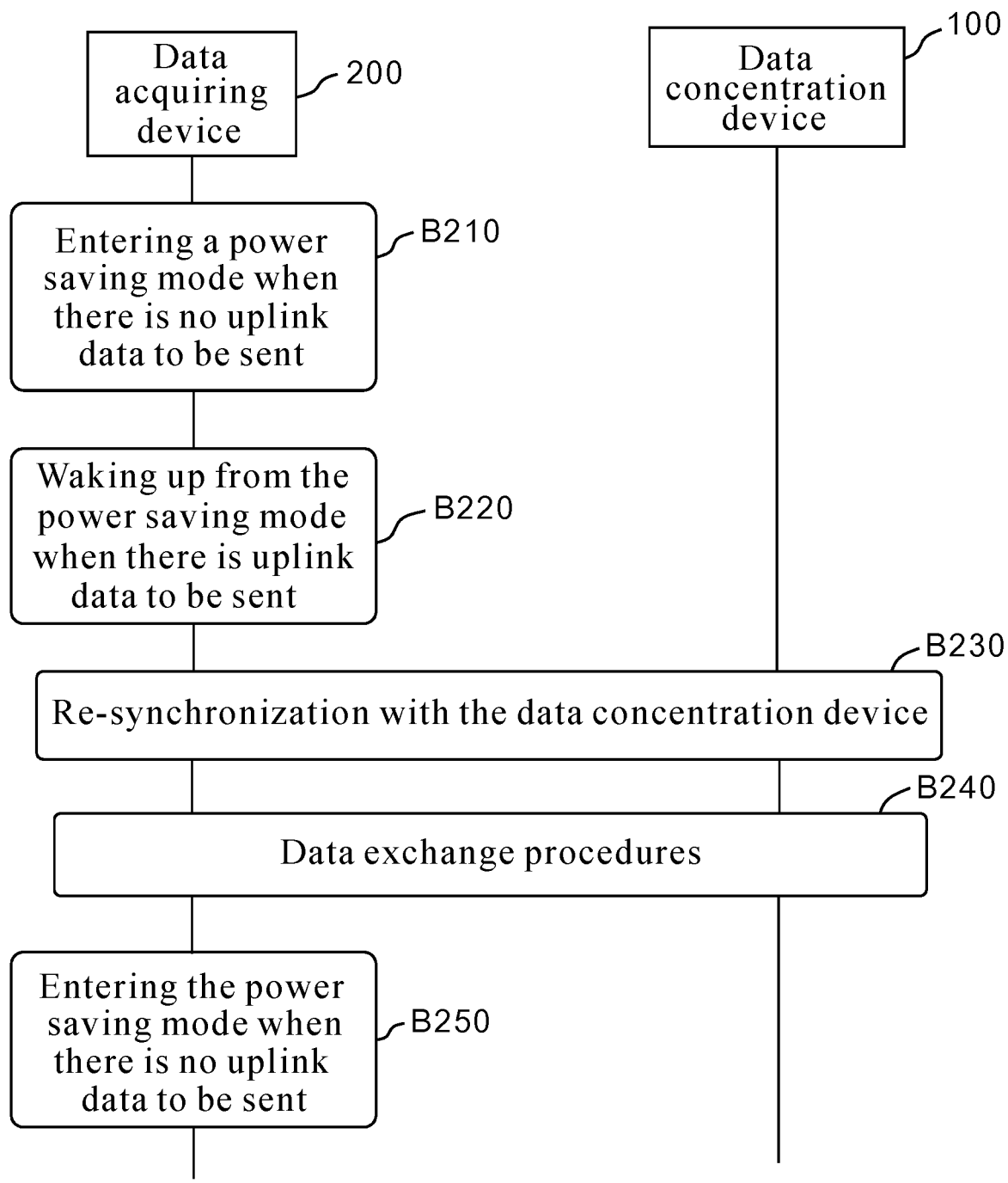
FIG. 14 is a schematic diagram illustrating a data acquiring device with power saving mode and communication procedures between a data concentration device and data acquiring device according to some embodiments.

Referring to FIG. 14, a data acquiring device with power saving mode and communication procedures between a data concentration device and data acquiring device are illustrated according to some embodiments.

The data acquiring device 200 cannot transmit data while there is no scheduled resource for the data acquiring device. In this way, the data acquiring device 200 can be implemented to enter a power saving mode to reduce power consumption, as indicated in a block B210 in FIG. 14, when there is no uplink data to be sent or no scheduled uplink resource. When the data acquiring device 200 has uplink data to send, the data acquiring device 200 can wake up or resume from the power saving mode, as indicated in a block B220. The data acquiring device 200 starts to re-synchronize with the data concentration device 100, as indicated in a block B230. After re-synchronization, data exchange procedures between the data concentration device 100 and the data acquiring device 200 can be performed, as indicated in a block B240. For example, the data acquiring device 200 sends uplink data to the data concentration device 100 if the data acquiring device 200 obtains the scheduled uplink resource. Afterwards, the data acquiring device 200 can be implemented to enter the power saving mode to reduce power consumption, as indicated in a block B250, when there is no uplink data to be sent or no scheduled uplink resource. Certainly, the implementation of the data concentration device and the data acquiring device is not limited to the above examples.

The embodiments as illustrated in FIG. 14 indicates that the data concentration device 100 can be capable of enabling at least one of the data acquiring devices 200 selectively in a power saving mode by way of the radio resource scheduling. Alternatively, the data acquiring devices 200 may be implemented to determine whether to enter the power saving mode according to one or more criteria, such as whether data to be sent exists, whether it is time to send data, or there is another situation. In these embodiments, the power consumption of the data acquiring devices 200 can be reduced effectively and efficiently.

In some practical applications, for example, the meters are water meters, gas meters or other meters that may have insufficient or no power provision for the data concentration device 100 or the data acquiring devices 200. For such applications, the data concentration device 100 and the data acquiring devices 200 can be implemented as being battery-powered. In such applications, the data concentration device 100 and the data acquiring devices 200 can be implemented based on one or more power saving approaches related to the embodiments of FIG. 14 so as to further achieve lower power consumption of the data concentration device 100 and the data acquiring devices 200, in addition to facilitation of a simplified advanced metering infrastructure system. As a result of the reduced power consumption, longer battery life can be achieved so that the data concentration device 100 and the data acquiring devices 200 can be realized to be operable much longer on the customer site, for example, for several months to a few years, without the need of frequent battery replacement. Certainly, the implementation of the data concentration device and data acquiring device is not limited to the above examples.

Figure 15:
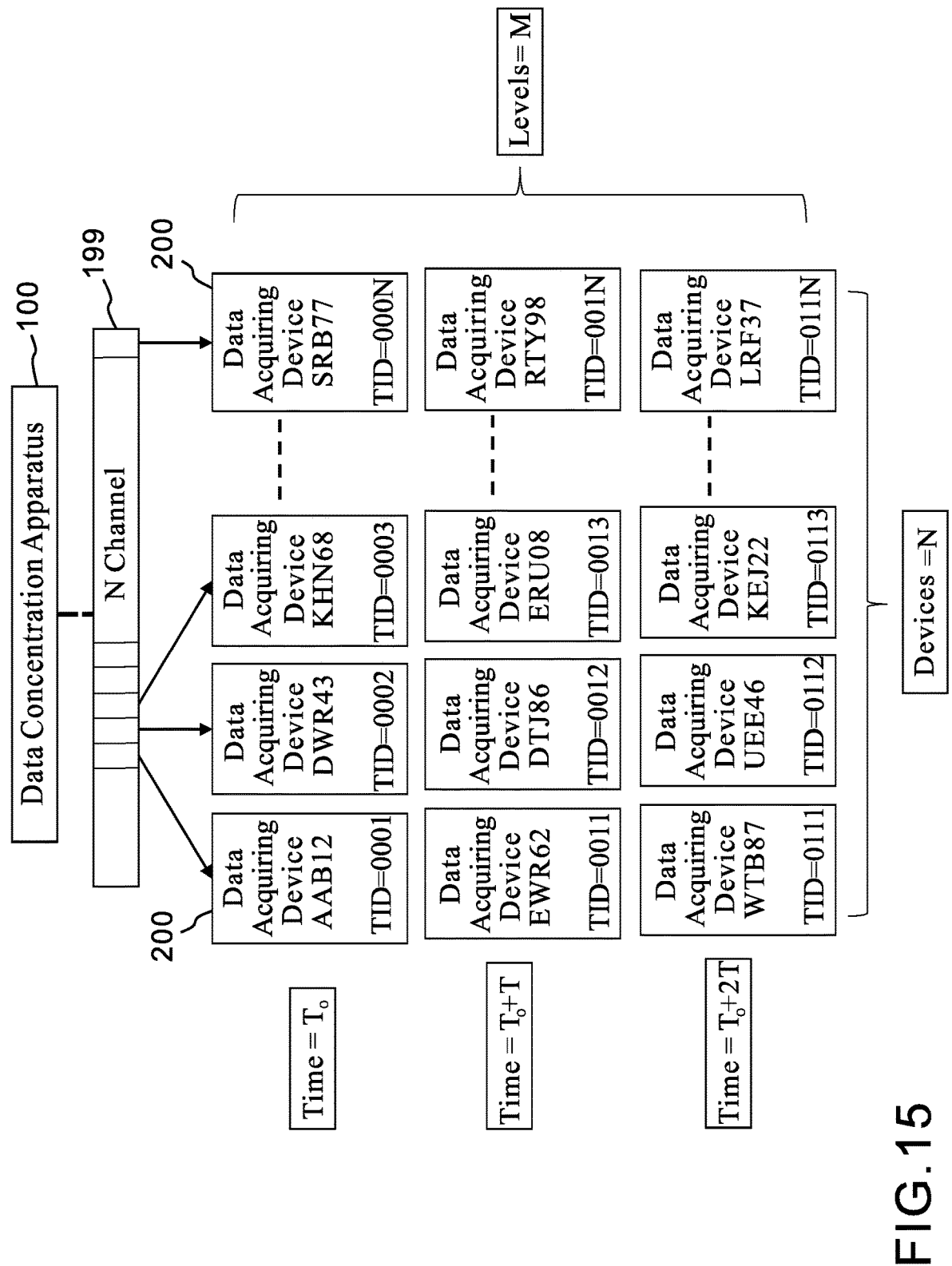
FIG. 15 is a diagram illustrating addressing protocol and device identification of a time-division method for communication between a data concentration apparatus and a plurality of data acquiring devices according to embodiments of the present invention.

Refer to FIG. 15, which is a diagram illustrating addressing protocol and device identification of a time-division method for communication between a data concentration apparatus 100 and a plurality of data acquiring devices 200 according to embodiments of the present invention.

In the embodiment illustrated in FIG. 15, the data concentration apparatus 100 utilizes a frame 199 for addressing a plurality of data acquiring devices 200. The frame 199 comprises a plurality of channels, for example N channels, comprising addresses of data acquiring devices 200.

Initially, each data acquiring device 200 comprises a unique user identification (UUID) that uniquely identifies an individual data acquiring device 200. For example, a data acquiring device's UUID is AAB12, or DWR43, OR DTJ86, etc. Once a data acquiring device 200 is registered with the data concentration apparatus 100, the data concentration apparatus 100 assigns the data acquiring device 200 a temporary identification (TID). A temporary identification (TID) is, for example, a string of numbers, letters, symbols, or a combination such as, 0001, 0012, 0113, etc. In the embodiment illustrated in FIG. 15, the data acquiring devices 200 that are simultaneously connected to the data concentration apparatus 200 are TID=0001, 0002, 0003, . . . 000N.

The number of data acquiring devices 200 that can be addressed at one time is limited by the number of channels or sub-channels in the frame 199. The maximum number of devices that are addressed at one time in FIG. 15 is shown as N. The data concentration apparatus 100 addresses up to N devices at one time and receives their data (e.g. meter data, meter ID, etc.). After the data concentration apparatus 100 receives the data from the N number of data acquiring devices 200 or a time period (T) limit has been reached, the next level or row of N number of data acquiring devices is addressed and given temporary identifications (TID) and the data transfer process is repeated for the current N number of devices. This time-division manner is repeated for M levels of devices. As a result, one data concentration apparatus 100 can address and receive data from M×N data acquiring devices 200. The number of data acquiring devices 200 that can interact with a single data concentration apparatus 100 can easily surpass 1,000 data acquiring devices 200. This makes the method of the present invention cost effective and efficient.

In an embodiment of the present invention, the frame 199 comprises 8 sub-channels and the data concentration device 100 can communicate with 8 data acquiring devices 200 simultaneous, for example, within each of a plurality of consecutive time intervals beginning at time instances $T_0$, $T_0+T$, $T_0+2T$, etc., as schematically indicated in FIG. 15. After a time period, for example T=100 ms, a new group of 8 data acquiring devices 200 is connected and after another time period (e.g., 100 ms) a new group of 8 data acquiring devices 200 is connected. In this time-division manner, 100, 500, 1000, or more data acquiring devices 200 can connect and communicate with a single data concentration device 100.

In an embodiment of the present invention the UUID is a 128-bit unique identifier for each data acquiring device 200. After the data acquiring device 200 is registered, the data acquiring device 200 receives a short temporary identification (TID), such as, for example, an 18-bit identification. 18-bits allows for 262,144 distinct combinations or in other words 18-bits for the TID allows the data concentration device 100 to address and connect to 262,144 unique data acquiring devices 200. The data concentration device 100 uses the TID to identify individual data acquiring devices 200 while communicating with and receiving data from each data acquiring device 200. In some examples, once finished transferring data or the time period (T) has expired, the data acquiring device 200 disconnects from the data concentration device 100 and the TID is discarded.

In certain situations, a data acquiring device 200 still has data that has not be transferred to the data concentration device 100 when the time period (T) expires. In these cases, the data concentration device 100 remembers the specific data acquiring device 200 and will schedule the specific device with higher priority so that the specific device will be connected to more frequently as the device is acquiring more data than the current scheduling is set up for. Similarly, if a specific device routinely has little data to transfer, the data concentration device 100 will lower the device's priority and schedule the device less frequently as the device is only collecting a small amount of data.

In an embodiment of the present invention, the data concentration device 100 will connect with data acquiring devices 200 that have a similar signal strength, for example, the data acquiring devices 200 are located a similar distance from the data concentration device 100. This prevents data acquiring devices 200 with strong signal strengths from being connected at the same time with data acquiring devices with weak signal strengths thereby preserving useful dynamic ranges.

In an embodiment of the present invention, data concentration devices 100 dynamically switch modes in order to operate as data concentration device 100 or data acquiring device 200. For example, device A is currently functioning as a data concentration device 100 and device B is currently functioning as a data acquiring device 200. Device A and device B can be reassigned remotely or can automatically switch functioning roles by negotiating between the devices and device B can switch modes to function as a data concentration device 100 and device A can switch modes to function as a data acquiring device 200. For example, if device A is functioning as a data concentration device 100 and the power battery is running low, device A can tell device B to switch roles to preserve or extend device A's battery life.

In an embodiment of the data concentration apparatus and system for advanced metering of the present invention, the system comprises a plurality of different types of meters. For example, some data acquiring devices 200 are connected to and collect data from electricity meters, some data acquiring devices 200 are connected to and collect data from water meters, and some data acquiring devices 200 are connected to and collect data from gas meters. Since each type of meter is designed for different utilities, the meters are located in different areas of a facility or different facilities. For example, some meters are located on the roof and some meters are located in the basement. In order to provide a signal strong enough or weak enough to effectively communicate with the data concentration device 100, the data concentration device 100 instructs the data acquiring device 200 to increase or decrease the gain in order to tune the signal strength to an appropriate level.

While the present disclosure has been described by means of specific embodiments, numerous modifications and variations could be made thereto by those skilled in the art without departing from the scope and spirit of the present disclosure set forth in the claims.

What is claimed is:

1. A data concentration apparatus for use in an advanced metering infrastructure system, the advanced metering infrastructure system including a communication network and a plurality of meters including a first meter and a second meter, and the second meter having a data acquiring device, the data concentration apparatus comprising:
    a data interface capable of being electrically coupled to the first meter to obtain first data originated in the first meter; and
    a data concentration module electrically coupled to the data interface and capable of wireless communication using a first communication standard and wireless communication with the communication network using a second communication standard,
    wherein the data concentration apparatus is configured to be physically attached to the first meter,
    wherein the data concentration module is capable of transmitting a first message to the communication network, and the first message includes the first data and a first indicator indicating that the first data originates in the first meter,
    wherein the data concentration module selectively allows wireless communication using the first communication standard for the data acquiring device, and the data concentration module, when receiving second data transmitted from the data acquiring device, transmits a second message to the communication network, and the second message includes the second data and a second indicator indicating that the second data originates in the second meter.

2. The data concentration apparatus according to claim 1, wherein the data concentration module includes:
    a first communication unit capable of wireless communication using the first communication standard; and
    a second communication unit, electrically coupled to the data interface and the first communication unit, capable of wireless communication with the communication network using the second communication standard, wherein the second communication unit transmits the first message to the communication network;
    wherein the first communication unit selectively allows uplink transmission for the data acquiring device so as to enable the data acquiring device to transmit the second data, and the first communication unit, when receiving the second data, transmits the second message to the communication network through the second communication unit.

3. The data concentration apparatus according to claim 1, wherein the data concentration apparatus is operable in one of a plurality of modes including a first mode and a second mode; in the first mode, the data concentration apparatus serves as a device for data acquiring that enables wireless communication using the first communication standard and disables wireless communication using the second communication standard; in the second mode, the data concentration apparatus serves as a base station or gateway that enables wireless communication using the first communication standard and wireless communication using the second communication standard.

4. The data concentration apparatus according to claim 3, wherein the data concentration apparatus is operable to search for any communication device serving as a base station or gateway which provides a wireless link using the first communication standard; when the data concentration apparatus finds and links to the communication device, the data concentration apparatus is operable in the first mode; when the data concentration apparatus does not find or fails to link to the communication device, the data concentration apparatus is operable in the second mode.

5. The data concentration apparatus according to claim 1, wherein the data concentration module is configured to allow downlink transmission for the data acquiring device when there is downlink data to be sent to the data acquiring device and number of allocated downlink time slots in radio resource is less than a downlink allocation number threshold.

6. The data concentration apparatus according to claim 1, wherein the data concentration module is configured to allow uplink transmission for the data acquiring device according to a corresponding priority of the data acquiring device.

7. The data concentration apparatus according to claim 1, wherein the data concentration module is configured to allow uplink transmission for the data acquiring device according to a waiting time of the data acquiring device.

8. The data concentration apparatus according to claim 1, wherein the data concentration module is configured to allow uplink transmission for the data acquiring device according to a corresponding priority of the data acquiring device and a waiting time of the data acquiring device.

9. The data concentration apparatus according to claim 1, wherein the first communication unit includes a transceiver unit.

10. The data concentration apparatus according to claim 9, wherein the first communication unit further includes a controller electrically coupled between the transceiver unit and the second communication unit.

11. The data concentration apparatus according to claim 9, wherein the first communication unit communicates with a server via the second communication unit so as to selectively allow the wireless communication using the first communication standard for the data acquiring device.

12. A system for advanced metering comprising:
    a data concentration device configured to be physically attached to a first meter to obtain first data from the first meter, the data concentration device including:

a data interface, capable of being electrically coupled to the first meter to obtain the first data from the first meter; and a data concentration module electrically coupled to the data interface and capable of wireless communication using a first communication standard and wireless communication with a communication network using a second communication standard; wherein the data concentration module transmits a first message to the communication network, and the first message includes the first data and a first indicator indicating that the first data originates in the first meter; and a data acquiring device configured to be physically attached to a second meter to obtain second data from the second meter and being capable of wireless communication using the first communication standard;

wherein the data concentration module selectively allows wireless communication using the first communication standard for the data acquiring device, and wherein the data concentration module, when receiving the second data transmitted from the data acquiring device, transmits a second message to the communication network, and the second message includes the second data and a second indicator indicating that the second data originates in the second meter.

13. The system for advanced metering according to claim 12, wherein the data concentration module is configured to allow downlink transmission for the data acquiring device when there is downlink data to be sent to the data acquiring device and number of allocated downlink time slots in radio resource is less than a downlink allocation number threshold.

14. The system for advanced metering according to claim 12, wherein the data concentration module is configured to allow uplink transmission for the data acquiring device according to one or both of a corresponding priority of the data acquiring device and a waiting time of the data acquiring device.

15. The system for advanced metering according to claim 12, wherein the data concentration module communicates with a server via the wireless communication with the communication network using the second communication standard so as to selectively allow the wireless communication using the first communication standard for the data acquiring device.

16. The system for advanced metering according to claim 12, wherein the data acquiring device transitions to a power saving mode when the data acquiring device has no data to be sent.

17. The system for advanced metering according to claim 16, wherein the data acquiring device resumes from the power saving mode when the data acquiring device has any data to be sent, and the data acquiring device transmits the data to the data concentration module when the data concentration module allows uplink transmission for the data acquiring device.

18. The system for advanced metering according to claim 12, wherein the data concentration device is powered by the first meter and the data acquiring device is powered by the second meter.

19. The system for advanced metering according to claim 12, wherein the data concentration device is battery-powered and the data acquiring device is battery-powered.

* * * * *